United States Patent
Bartholomä et al.

(10) Patent No.: US 9,411,866 B2
(45) Date of Patent: Aug. 9, 2016

(54) REPLICATION MECHANISMS FOR DATABASE ENVIRONMENTS

(71) Applicants: Christian Bartholomä, Oftersheim (DE); Michael Mühle, Walldorf (DE); Hans-Jörg Leu, Dossenheim (DE); Steffen Geissinger, Wiesloch (DE); Thorsten Glebe, Leimen (DE); Martin Heidel, Walldorf (DE); Lars Fricke, Karlsruhe (DE); Volker Diesel, Tiefenthal (DE); Christian Bensberg, Heidelberg (DE)

(72) Inventors: Christian Bartholomä, Oftersheim (DE); Michael Mühle, Walldorf (DE); Hans-Jörg Leu, Dossenheim (DE); Steffen Geissinger, Wiesloch (DE); Thorsten Glebe, Leimen (DE); Martin Heidel, Walldorf (DE); Lars Fricke, Karlsruhe (DE); Volker Diesel, Tiefenthal (DE); Christian Bensberg, Heidelberg (DE)

(73) Assignee: SAP GLOBAL IP GROUP, SAP AG, Walldorf (DE)

( * ) Notice: Subject to any disclaimer, the term of this patent is extended or adjusted under 35 U.S.C. 154(b) by 284 days.

(21) Appl. No.: 13/719,737

(22) Filed: Dec. 19, 2012

(65) Prior Publication Data

US 2014/0172794 A1    Jun. 19, 2014

(51) Int. Cl.
G06F 17/30 (2006.01)

(52) U.S. Cl.
CPC .............................. *G06F 17/30575* (2013.01)

(58) Field of Classification Search
CPC ................... G06F 17/30017; G06F 17/30339; G06F 17/30699; G06F 17/30702; G06F 17/30575; G06F 17/30297; G06F 17/30312; G06F 17/30348
USPC .................................................. 707/643, 638
See application file for complete search history.

(56) References Cited

U.S. PATENT DOCUMENTS

| 7,870,172 | B1 * | 1/2011 | Sarma .......................... 707/822 |
| 7,885,938 | B1 * | 2/2011 | Greene et al. ................. 707/674 |
| 8,112,396 | B2 * | 2/2012 | Zak et al. ...................... 707/640 |
| 8,135,763 | B1 * | 3/2012 | Compton .......... G06F 17/30091 707/822 |
| 2003/0093431 | A1 * | 5/2003 | Cooke et al. .................. 707/100 |
| 2003/0147352 | A1 * | 8/2003 | Ishibashi et al. .............. 370/248 |
| 2005/0278277 | A1 * | 12/2005 | Forlenza et al. .................. 707/1 |
| 2008/0027998 | A1 * | 1/2008 | Hara ................. G06F 17/30203 |

OTHER PUBLICATIONS

European Search Report directed toward related European Application No. 13198236.5, mailed Jan. 5, 2015, 9 pages.
Packer, Allan N., "Chapter 17: Data Layout", Configuring and Tuning Databases on the Solaris Platform, 2002, pp. 227-266.

(Continued)

*Primary Examiner* — Usmaan Saeed
*Assistant Examiner* — Fariborz Khoshnoodi
(74) *Attorney, Agent, or Firm* — Sterne, Kessler, Goldstein & Fox, P.L.L.C.

(57) ABSTRACT

Data replication in a database includes identifying a source database system. The source database includes a main index file and a delta log file. To create a replica, one or more symbolic links to the source database system are generated. The symbolic links identify a path to a physical location of the source database. A replica of the source database is generated based on the symbolic links. The replica includes a copy of the main index file and delta log file. Information associated with the replica and the symbolic links is stored in a recovery log. Replica are provided transparently to most database engine components by re-using partitioning infrastructure. Components "see" replica as tables with a single partition; that partition is a local replica.

24 Claims, 11 Drawing Sheets

(56) References Cited

OTHER PUBLICATIONS

Thorwald, "Symbolic link", Wikipedia, the free encyclopedia, Dec. 11, 2012, accessed Nov. 21, 2014, http://en.wikipedia.org/w/index.php?title=Symboliclink&oldid=527443670, pp. 1-8.

"Table (database)", Wikipedia, the free encyclopedia, Nov. 25, accessed Nov. 21, 2014, http://en.wikipedia.org/w/index.php?title=Table%28database%29&action=history, pp. 1-2.

European Examination Report for Application No. 13198236.5, mailed Dec. 18, 2015, 9 pages.

"Database Engine", Wikipedia, Dec. 4, 2012, https://en.wikipedia.org/w/index.php?title=Database_engine&oldid=526288007, 2 pages.

"Database", Wikipedia, Dec. 18, 2012, https://en.wikipedia.org/w/index.php?title=Database&oldid=528573103, 2 pages.

* cited by examiner

Creation of new replicas with symbolic links

After materialization of all replicas

After new inserts/updates/deletes

Recovery of source

Recovery of replicas and symbolic links

Recovery of delta log entries

REPLICATION MECHANISMS FOR DATABASE ENVIRONMENTS

BACKGROUND

1. Technical Field

Embodiments relate generally to data processing environments and, more particularly, to a system providing data replication using a partitioning scheme.

2. Background Art

Computers are powerful tools for storing and providing access to vast amounts of information. Computer databases are a common mechanism for storing information on computer systems while providing easy access to users. A typical database is an organized collection of related information stored as "records" having "fields" of information. As an example, a business may have a database of employees. The database of employees may have a record for each employee where each record includes fields designating specific properties or information about any employee, such as, but not limited to the employee's name, contact information, and salary.

Between the actual physical database (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, all without user knowledge of the underlying system implementation. In this manner, the DBMS provides users with a conceptual view of the database that is removed from the hardware level. The general construction and operation of database management systems is well known in the art.

Certain tables of a database may perform join operations. During the join operation it is often required to move or copy the tables or intermediate results to other hosts of the same database instance, which is called a remote join. This significantly affects performance. Therefore it is reasonable to have local replicas on all relevant servers. However, replication causes a higher memory consumption and affects overall system performance.

When a row is inserted into a table, a record is written into a delta log. At this moment in time, an entry is also written into a recovery (redo) log. If a user performs a recovery operation of the database, not only the backup files but also the recovery log is taken into consideration. After the restoration of the backup files, the recovery log is read and in this way the delta log is restored at file level. Upon table access, the delta log is read and the data becomes available for processing.

A DBMS offers the ability to initially create replica of a non-replicated table. The non-replicated table is copied n times for all required replica. The problematic aspect is when a recovery operation is performed, the copy functionality has to work with backup and recovery functionality in a way that after recovery all data is replicated again. The simple approach to achieve this is to write all copies of the original table into the recovery log of the database. This file is read during recovery and based on its contents, all replicates are being restored. This approach has a negative effect, however, as the tables that are subject for replication are usually very large and writing them n times for n copies into the recovery log causes files that are extremely big.

Therefore, what is needed is a replication mechanism that is substantially transparent to components of the database system. Specifically, what is needed is a replication mechanism that uses other database engine infrastructures (like a partitioning feature) in which the components "think" of replication as a partitioned table—one with just a single partition, in which the single partition is the local replica.

BRIEF SUMMARY

Described herein are system, method, and computer program product embodiments, and combinations and sub-combinations thereof, for data replication in a database system environment. In embodiments, data replication includes identifying a source database. The source database includes a main index file and a delta log file. One or more symbolic links to the source database are generated. The symbolic links identify a path to a physical location of the source database. A replica of the source database is generated based on symbolic links. The replica includes a copy of the main index file and delta log file. Information associated with the replica and the one or more symbolic links is stored in a recovery log.

Further embodiments, features, and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of embodiments of the invention and to enable a person skilled in the relevant art(s) to make and use embodiments of the invention.

Figure 1:
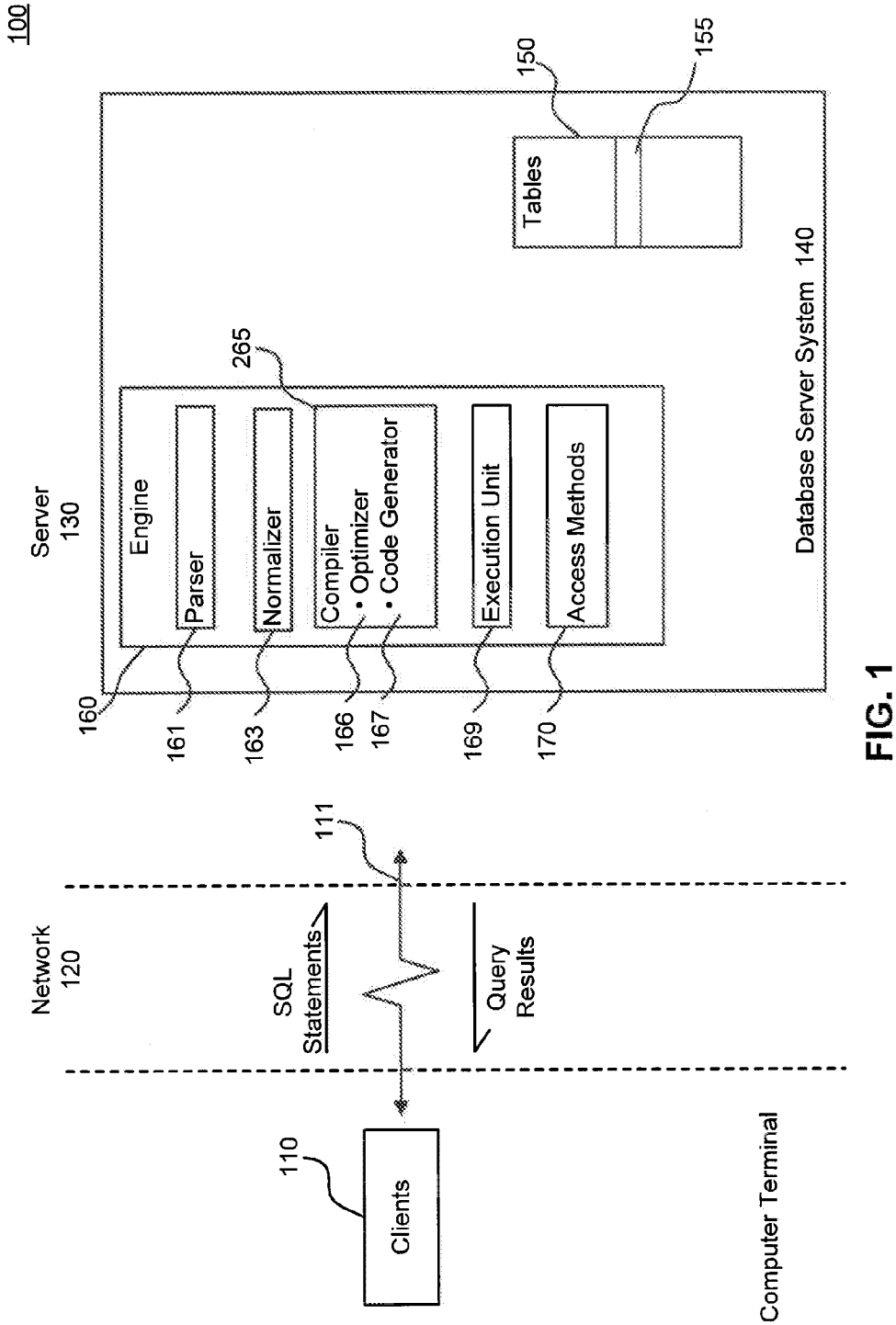
FIG. 1 is an exemplary database computing environment in which embodiments may be implemented.

The features and advantages of embodiments of the invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

FIG. 1 illustrates the general structure of a client/server database system 100 suitable for implementing embodiments. (Specific modifications to the system 100 for implementing other embodiments are described in subsequent sections below.) As shown, the system 100 comprises one or more client computing device(s) 110 connected to a server 130 via a network 120. Specifically, the client computing device(s) 110 comprise one or more standalone terminals connected to a Database Management System 140 ("DBMS") using a conventional network 120. In an exemplary embodiment, the terminals may themselves comprise a plurality of standalone workstations, dumb terminals, or the like, or comprise personal computers (PCs). Typically, such units would operate under a client operating system, such as a Microsoft® Windows, Unix, Apple®, etc., client operating system The database server system 130, which comprises SAP® HANA® (available from SAP) in an exemplary embodiment, generally operates as an independent process (i.e., independently of the client computing devices), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat). The network 120 may be any one of a number of conventional wired and/or wireless network systems, including a Local Area Network (LAN) or Wide Area Network (WAN), as is known in the art (e.g., using Ethernet, IBM Token Ring, or the like). In an embodiment, the network 120 includes functionality for packaging client calls in the well-known Structured Query Language (SQL) together with any parameter information into a format (of one or more packets) suitable for transmission to the database server system 140. The described computer hardware and software are presented for purposes of illustrating the basic underlying desktop and server computer components that may be employed for implementing embodiments of the present invention. For purposes of discussion, the following description will present examples in which it will be assumed that there exist multiple server instances (e.g., database server nodes) in a cluster that communicate with one or more "clients" (e.g., personal computers or mobile devices). The embodiments of the present invention, however, is not limited to any particular environment or device configuration. Instead, embodiments may be implemented in any type of system architecture or processing environment capable of supporting the methodologies presented herein.

In operation, the client computing device(s) 110 store data in, or retrieve data from, one or more source database tables 150, as shown at FIG. 1. Data in a relational database is stored as a series of tables, also called relations. Typically resident on the server 130, each table itself comprises one or more "rows" or "records" (tuples) (e.g., row 155 as shown at FIG. 1). A typical database will include many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. SQL statements may be divided into two categories: data manipulation language (DML), used to read and write data; and data definition language (DDL), used to describe data and maintain the database. DML statements are also called queries. In operation, for example, the client computing device(s) 110 issue one or more SQL commands to the server 130. SQL commands may specify, for instance, a query for retrieving particular data (i.e., data records meeting the query condition) from the database table(s) 150. In addition to retrieving the data from database server table(s) 150, the clients 110 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 110 (via network 120) are processed by the source database engine 160 of the DBMS 140. The source database engine 160 itself comprises a parser 161, a normalizer 163, a compiler 165, an execution unit 169, and access method(s) 170. Specifically, the SQL statements are passed to the parser 161 which employs conventional parsing methodology (e.g., recursive descent parsing). The parsed query is then normalized by the normalizer 163. Normalization includes, for example, the elimination of redundant data. Additionally, the normalizer 163 performs error checking, such as confirming that table names and column names which appear in the query are valid (e.g., are available and belong together). Finally, the normalizer 163 can also look-up any referential integrity constraints which exist and add those to the query.

After normalization, the query is passed to the compiler 165, which includes an optimizer 166 and a code generator 167. The optimizer 166 performs a cost-based analysis for formulating a query plan that is reasonably close to an optimal plan. The code generator 167 translates the query plan into executable form for execution. The execution unit 169 executes the query plan using the access methods 170.

In order to increase performance for processing queries or recover from crash of the database server system, a database management system, such as DBMS 140, may replicate database tables.

Figure 2:
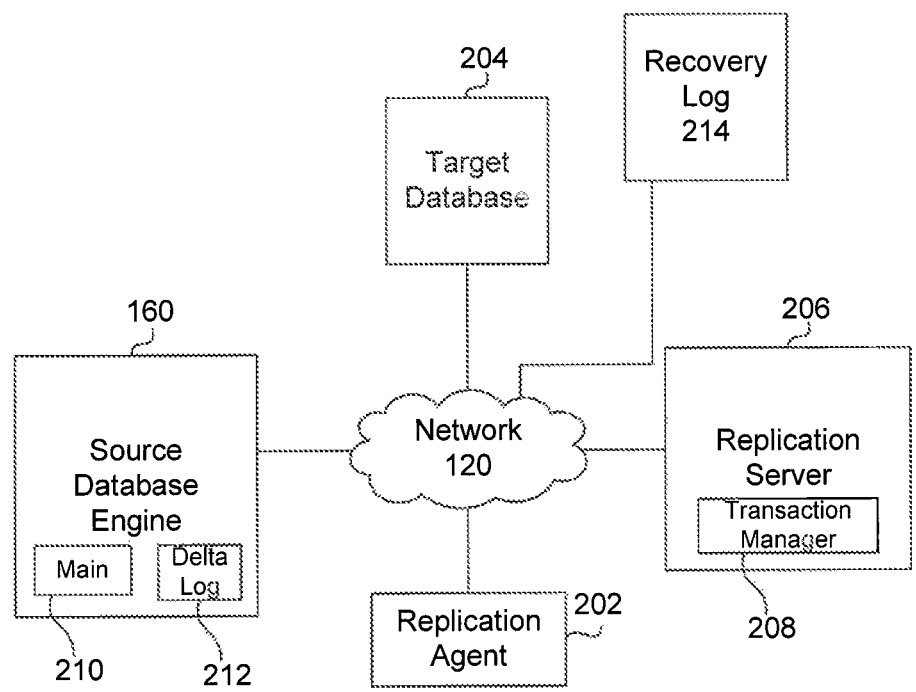
FIG. 2 illustrates a block diagram of a source database engine and a replication server, according to embodiments.

FIG. 2 is a system 200 in which embodiments, or portions thereof, can be implemented. Source database engine 160 communicates over network 120 with replication server 206, in accordance with an embodiment.

Also in communication over network 120 is a replication agent 202. The replication agent 202 facilitates the replication process by, in accordance with an embodiment, scanning a transaction log 212 for changes at source database engine 160 and sending those changes to replication server 206. One skilled in the relevant arts will further recognize that the network 120 can be configured in a number of ways in order to achieve the same result, and the aforementioned configuration is shown by way of example, and not limitation. For instance, in accordance with an embodiment, replication agent 202 and source database engine 160 are located in a single physical computing device or cluster of computing devices.

Source database engine 160 includes a source database or main index 210 and a transaction log or delta log 212, in accordance with an embodiment. Each transactional operation, such as inserts, updates, and deletes to the source database 210, causes a log record to be written to the transaction (delta) log 212. Each particular delta log record characterizes the change which has occurred to the source database or main index 210 during processing of a transaction. These log records can be used, for instance, in error recovery, to restore the source database engine 160 to a preexisting, consistent state.

In a traditional log-based replication system, changes to the source database engine 160 are sent to replication server 206 over network 120, which then applies these changes, over network 120, directly to target database 204. As is commonly understood, the replication server 206 starts threads, which are responsible for transferring the data from an outbound queue to the target database 204.

According to an embodiment, replication server 206 is configured to identify the source database based on the query received. A source database has an internal object identifier and optionally a name associated with it. The internal object identifier is retrievable by replication server 206 upon receiving a query request, such as a SQL query. As discussed previously, a SQL query may specify retrieving, updating or deleting particular data (i.e., data records meeting the query condition) from the source database table. Upon receiving the SQL query and updating the source database table 210, source database engine 160 sends information associated with the SQL query to replication server 206. The information can include the internal object identifier of the source database engine 160. The internal object identifier can identify the name and location of the source database, according to embodiments.

Replication server 206 receives the SQL query and generates at least one symbolic link to the source database engine. The symbolic link identifies a path to the source database engine 160 and its associated source database 210 and delta log 212. A symbolic link can be a file that includes a reference to source database engine 160 in the form of an absolute or relative path. Symbolic links operate transparently for most operations. Thus programs that read or write to files named by a symbolic link will behave as if operating directly on the target file. However, programs that need to handle symbolic links specially (e.g., backup utilities) may identify and manipulate them directly. A symbolic link includes a text string that is automatically interpreted and followed by the persistence layer of the database as a path to the source database engine 160. The symbolic link exists independently of the source database engine 160.

Replication server 206 generates a replica at target database 204 based on the generated symbolic links. The replica is a copy of the source database engine 160 and its associated files. The replica includes at least a copy of the main index 210 and delta log 212 of the source database engine 160. Since the replica is generated based on the symbolic links, which is essentially a pointer and soft link to the source database engine 160, only a few data entries are written to the Recovery Log 214. Before further insertions, modifications, and deletions of data may occur, the symbolic links of Target Database 204 have to be materialized. During this step, the source data of 210 and 212 is read and persisted locally. However, the important aspect is that the data is not written to the Recovery Log 214. Upon inserts, modifications and deletions, the actual change to delta structures is broadcasted from the Source Database Engine 160 to all Target Databases 204. The inserts, modifications and deletions are written into each delta log (source and target systems) as well as n times to the Recovery Log 214. According to embodiments, recovery log 214 keeps track of the symbolic links and any delta log changes. In other words, new changes are still written n times to the recovery log 214—but the initial copy step causes minimal data volume. Accordingly, the recovery log 214 can be kept at a more manageable size and thus increase system performance.

According to an embodiment, the replicas of target database 204 are materialized. Materialization includes the physical copying of the data from source database engine 160 to the target database 204. As noted previously, since the replicas are initially created via symbolic links, the files associated with the target database 204 are initially empty with the exception of the symbolic link information. During a materialization step, which may occur explicitly or take place during a delta merge of tables, the data in the source database 160 is copied to the target database 204. Thus, the main index file and the delta log file (not illustrated) of the target database 204 will now have a mirror copy of the contents in the source database 210 and delta log 212. Once materialization is accomplished, the symbolic link is removed and the contents of the source database engine 160 are deleted.

According to embodiments, if a recovery operation is performed, the recovery log 214 is opened and read. Since recovery log 214 includes information associated with the symbolic link, the recovery log 214 can be used to restore the original source database engine 160 along with all of its replicas at the time when the copy process took place. If the replicas were changed after the copy process, these changes will also be replayed from the recovery log 214. According to embodiments, all n replicas recover from a single copy of the data. If the administrator creates a new backup after the replicas have been materialized, the complete data of all replicas will be stored n times for n replicas in the backup media. Using this mechanism, full copies of the source table will be created on all relevant servers. At the same time, the symbolic links assure that backup and recovery works without creating a large recovery log.

Figure 3A:
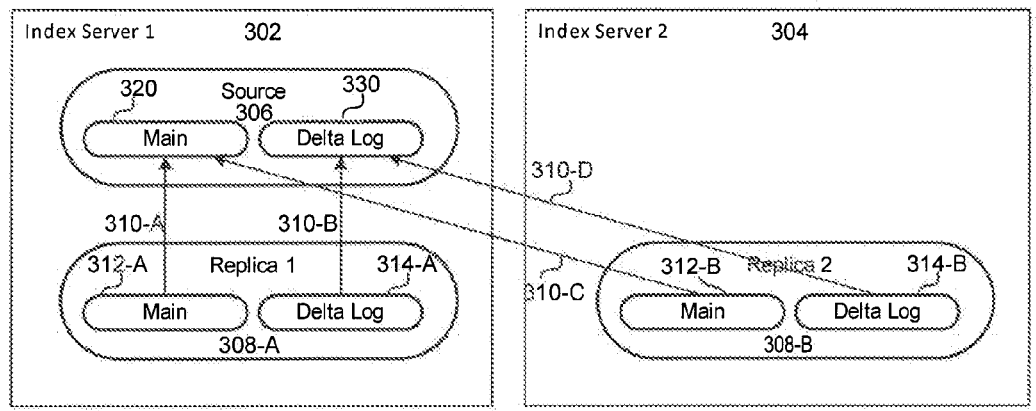
FIGS. 3A-3G illustrate a replication and recovery process, according to embodiments.

FIGS. 3A-3G illustrate a replication and recovery process according to embodiments. In particular, FIG. 3A illustrates an exemplary replication process and shows a server 302 and a server 304. Server 302 includes source database table 306 which comprises a main index 320 and a delta log 330. A replication of source database table 306 is accomplished via the generation of symbolic links 310. Each symbolic link 310 creates a soft link from the source database table 306 to its associated replica 308. In this example, there are 2 replicas 308. Replica 308-A is created on server 302-A via symbolic links 310-A and 310-B. Similarly, replica 308-B is created on server 304 via symbolic links 310-C and 310-D. As illustrated, each replica 308 can include a main index 312 and delta log 314 which mirrors the contents of main index 320 and delta log 330 of source database table 306. However, it is important to note that the main index 312 and delta log 314 are initially empty and only include information related to their corresponding symbolic link. The corresponding symbolic link 310 identifies the physical location of main index 320 and delta log 330, for example.

Figure 3B:
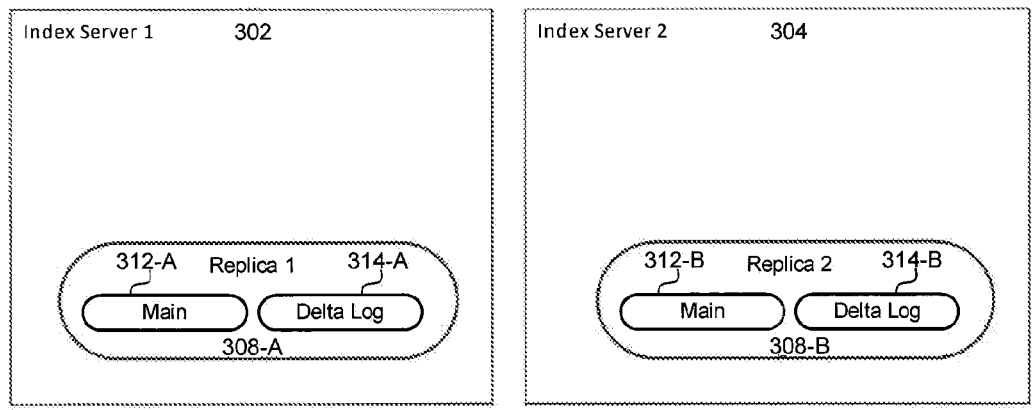
Figure 3C:
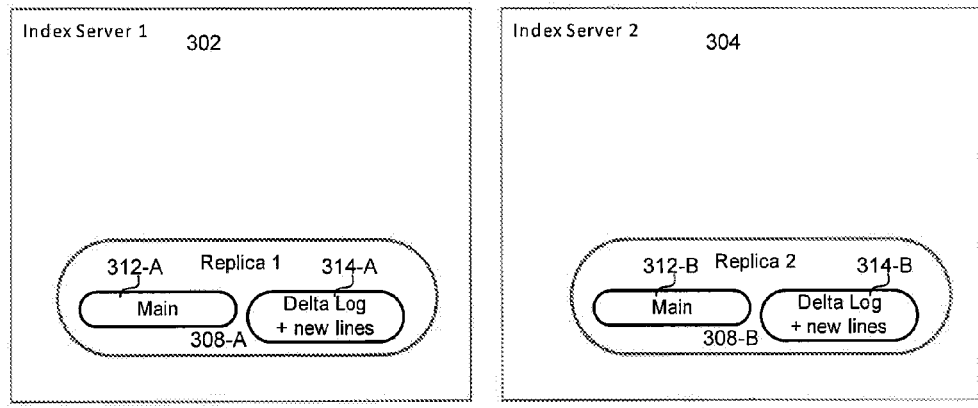

FIG. 3B illustrates the materialization of all replicas in the system. As shown, the symbolic links 310 and the source database table 306 are removed. Prior to removal of the source database table 306, the physical contents of the source database table 306 are copied to each replica 308. Additionally a count of all the symbolic links 310 is tracked. In an embodiment, the source database table 306 is removed once a threshold is met. For example, a counter may be implemented where the max value of the counter corresponds to the number of symbolic links 310. The counter is decremented after each replica 308 is materialized. Once the counter hits zero and it is certain that all replicas 308 have been materialized, the source database table 306 is removed. Thus, the main index 312 and delta log 314 of replicas 308 now include a mirror copy of the contents of the source database 306. Upon receiving a data change request via SQL, the replicas 308 are updated. This is illustrated in FIG. 3C. As shown, the delta logs 314 are updated with any new information that is provided via the SQL statement. Thus, any additions, deletions, or modifications to the data will be logged by the delta logs 314.

Figure 3D:
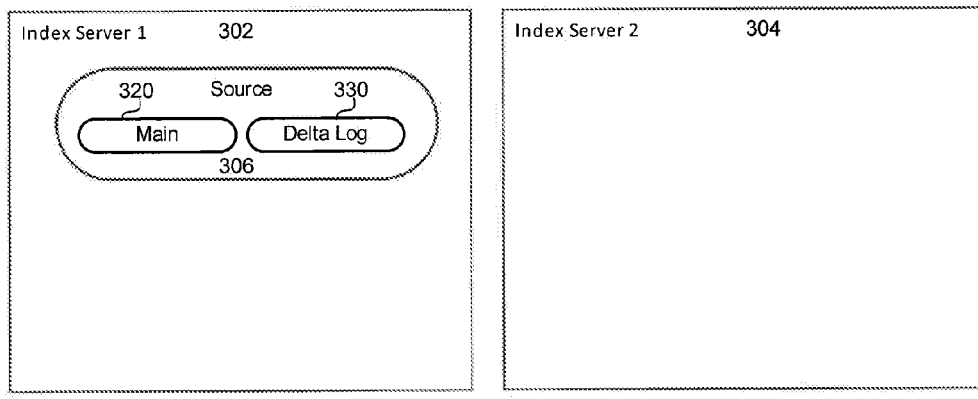

FIGS. 3D-3G illustrate the recovery process, according to embodiments. As discussed previously, a recovery log 214 is maintained by the system and keeps track of all symbolic links and delta log changes. Thus, when a recovery operation is requested, the source database table 306 is regenerated as illustrated by FIG. 3D. Since the recovery log 214 includes the symbolic links to the source database table 306, the contents of the source database table 306 may be traced via the physical location associated with the symbolic links 310 and the source database table 306 may be regenerated.

Figure 3E:
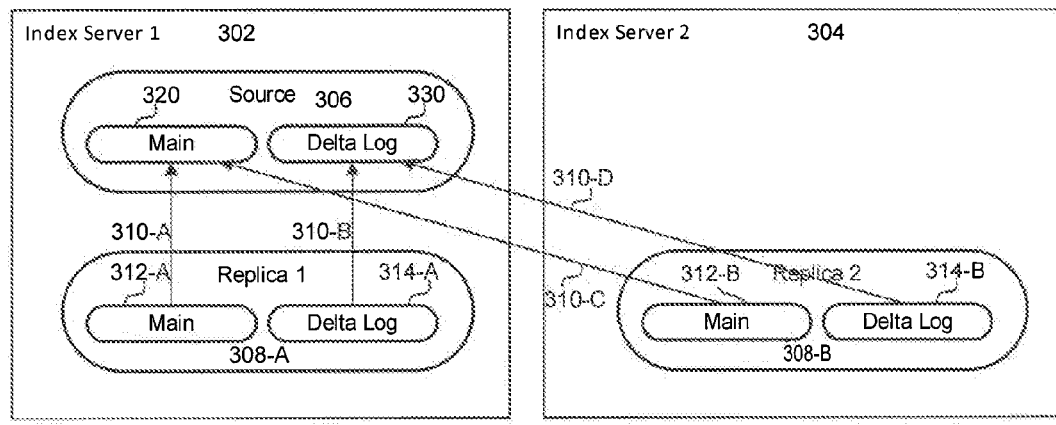
Figure 3F:
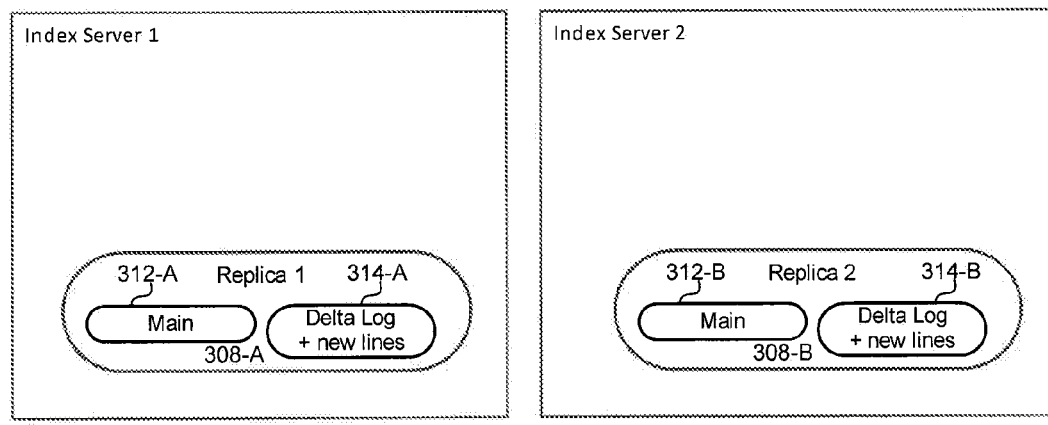
Figure 3G:
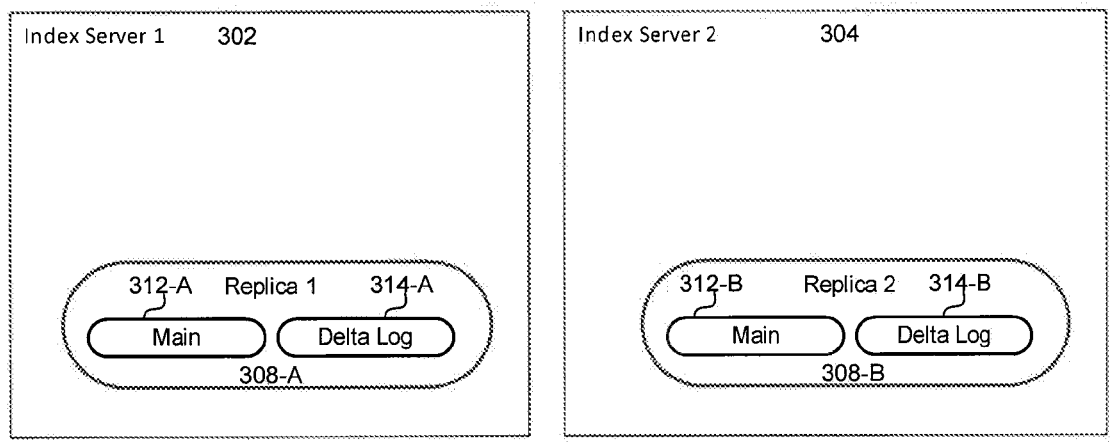

The next step in the recovery process is to recover all replicas 308 and symbolic links 310 as illustrated by FIG. 3E. Once again, the recovery log 214 is read and the system is restored to its previous state as was illustrated in FIG. 3A. FIGS. 3F and 3G illustrate the materialization and recovery of the delta log entries, respectively. Thus, in this way, recovery of a database system, including all replicas 308, can be achieved by reading a recovery log 214 which only includes information related to symbolic links 310 and changes to the delta log 314.

Example Replication Via Partitioning and Test Cases

Figure 4:
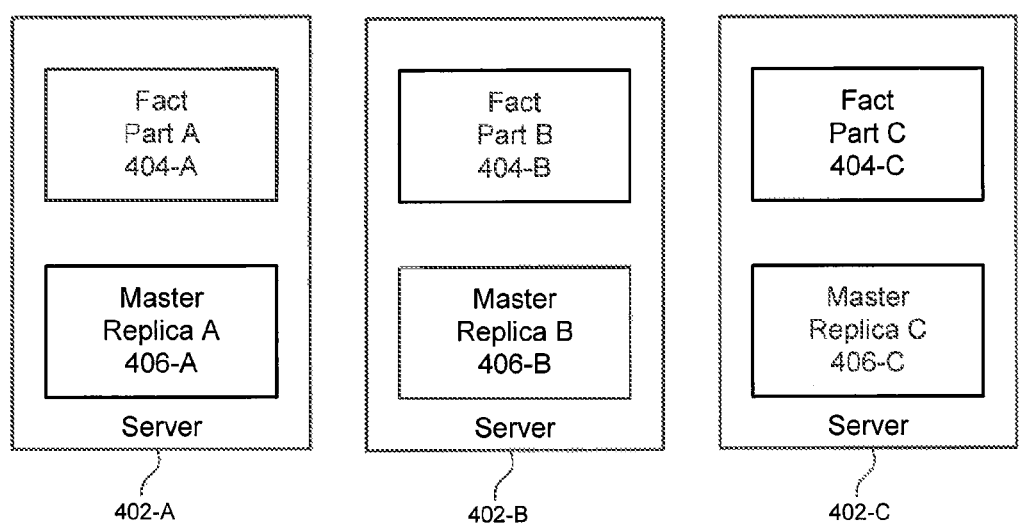
FIG. 4 illustrates a replication-partitioning system, according to embodiments.

FIG. 4 illustrates a replication-partitioning system 400, according to embodiments. Replication-partitioning system 400 includes a plurality of serve's 402. Each server 402 includes a fact partition table 404 and a replica 406 of master data.

In an embodiment, fact partition tables 404 provide the measurements, metrics, or facts of a business process. Fact partition tables 404 include numeric data such as sales figures, numbers of units, percentages, and various other additive measurements. The values of fact partition tables 404 act as independent variables by which dimensional attributes are analyzed. Fact tables are often defined by their grain. The grain of a fact table represents the most atomic level by which the facts may be defined. For example, the grain of a sales transaction fact table might be stated as "Transaction quantity by Day by Product by Store." Each record in a fact table is therefore uniquely defined by a day, product and store.

A partitioning feature may be supported by search engines (search on plain tables, OLAP engine), within a TableUpdate operation (Insert/Update/Delete) provided by the database system. In general, components either run in a mode for a non-partitioned table or in a mode for partitioned tables. According to embodiments, the components of the database system may call a method such as Table::getPartNames( ) which returns the name and number of partitions present in the system for a given table. For example, in the case of a non-partitioned table, a call to Table::getPartNames( ) will return zero, while it will return existing part names in the case of a partitioned table. During an insert operation, the rows that shall be inserted are evaluated based on the partition specification and inserted into the right part of the table.

To achieve replication according to embodiments, the functionality of Table::getPartNames( ) method is adjusted. In the case of replication, the method Table::getPartNames( ) is modified such that it always returns the local replica (with respect to the server on which it is being executed) as the only available partition. If there is no local replica, it returns any replica. Additionally, the insert/update/delete logic in a Table-Update operation is modified so that it does not insert/updates/deletes a row into a single partition, but rather inserts/updates/deletes the row into all partitions/replicas.

As discussed previously, most components of the database system call Table::getPartNames( ) and this returns a local replica. This serves well for most use cases. During plan generation, however, this is not sufficient. As discussed previously, a plan generation is an ordered set of steps used to access or modify information in a database. There are typically a large number of ways to execute a given query, with widely varying performance. When a query is submitted to the database, the query optimizer evaluates some of the different, correct possible plans for executing the query and returns what it considers the best alternative.

A query plan (e.g., within the OLAP Engine) is created on an arbitrary host server (not illustrated). The plan is then executed on relevant servers 402. A final plan must include partition names of fact partition tables 404. FIG. 4 illustrates three parts of a fact table on 3 servers. During OLAP processing, these three fact partition tables 404-A, 404-B, and 404-C are joined with the master table (not illustrated). The master table is replicated and a master replica 406 is present on each server 402. Ideally the plan generation creates a plan that joins source database. A replica of the source database is generated based on the symbolic links. The replica includes a copy of the main index file and delta log d (This is the case for partitioning)—whereas there are 3 copies of the entire master data table (This is the case for replication). During plan generation, it determines the replica which is local to the respective fact table part, for example it joins 404-B with 406-B.

Test Case Scenario for Replication Via Partitioning

For partitioning, the TableUpdate operation handles the insertion, modification, or deletion of data as follows: it uses a Part Allocator component to determine into which partition a row has to be inserted. For modifications and deletions of data, Part Allocator analyzes the TableUpdate operation to be performed based on the partition specification and determines which partition an update or delete has to be delegated.

The first test case for replication is fairly trivial: Always send all TableUpdate operations to all replicas. In this way, all replicas are modified in the same way synchronously within a single transaction. There is no single point that holds any locks and there are no bottlenecks of data. A client can send its insert/update/delete to any of the servers and each server handles their respective updates. With this implementation, replication would be as efficient as partitioning. However, the load and memory consumption would be higher as all replicas are modified during each transaction.

Figure 5:
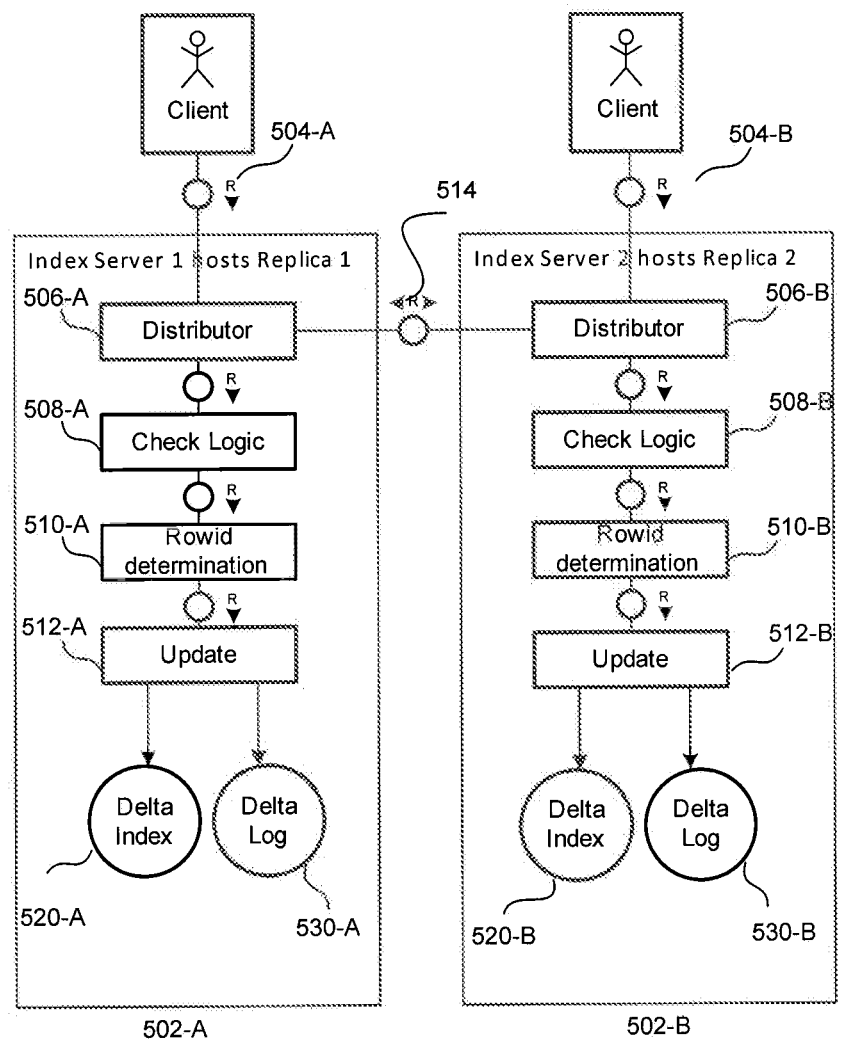
FIG. 5 illustrates an example test case of replication, according to embodiments.

FIG. 5 shows an example diagram of replication using this example test case. As illustrated, in order to propagate data changes to servers 502 hosting a replica, there are independent client requests 504-A and 504-B generated to manipulate different data. As illustrated, each server 502 performs its respective processing on the client request by interactions with a distributor module 506, a check logic module 508, a rowid determination module 510 and an update module 512. Ultimately the request is written to the index log 520 and the delta log 530. In this scenario, a replication operation occurs almost immediately after receiving a client request 504. For example, upon receipt of the client request 504, the distributor module 506-A generates a replication request 514 and propagates the request to distributor module 506-B of server 502-B. At this point, each server 502 is individually responsible for handling the replication of data. Thus, server 502-A will send the client request 504-A to check logic module 508-A, which determines the parameters of the query. The rowid determination module 510-A then determines new rowids for new rows. Update module 512-A then performs an update of delta index log 520-A and delta log 530-A. Server 502-B performs a similar replication technique using its corresponding distributor module 506-B, check logic module 508-B, rowid determination module 510-B and update module 512-B. Thus, delta index log 520-B and delta log 530-B will also be updated.

This example test case has the drawback that several operations have to be executed independently on all replicas, which may cause unnecessary CPU consumption. Additionally, an internal rowid column is utilized to uniquely identify a row. The rowid acts as a key identifier. Using this test case, each replica would typically have different rowids for the very same row. This is a very critical aspect as some internal operations issue a query first, retrieve rowids and use the rowids to update rows. These rowids are only valid for one replica. On the other replicas, they typically identify different rows.

Thus, embodiments provide an implementation approach which ensures that replicas have the same rowid values for a given row. This is accomplished by having a component which provides rowids for replicas. This component would exist only once and hold an exclusive lock during processing. TableUpdate performs many tasks during processing. This includes various checks and the determination of the rowid values. In the very end it applies all modifications to the delta index and writes the modifications to the delta log 530. This is the point where replication is introduced: these net changes are replicated to all relevant replicas. In this way the load on the other servers is low as no further checks have to be applied. The net changes also include the rowid column just like all other columns. Thus the same rowid values are achieved without the need for special operations by each server. Specifically the advantage is that no additional locks for sychronizing rowid determination among the servers/replica is required.

Figure 6:
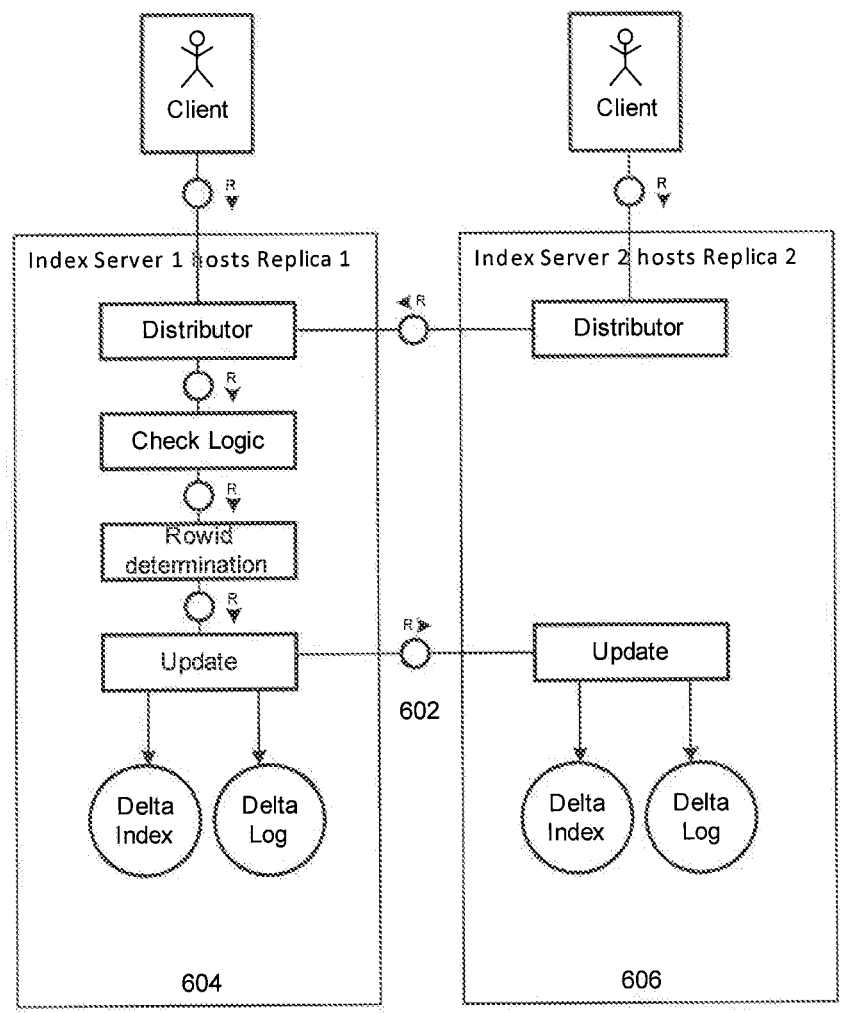
FIG. 6 illustrates another example test case of replication, according to embodiments.

FIG. 6 illustrates this implementation, according to embodiments. As illustrated, the replication request 602 is generated once. This is possible, because the rowid determination module on server 604 handles the determination of rowids for all replicas. The update module is then responsible for propagating the replication request to all servers hosting a replica. Since the rowid determination is made prior to the replication request, all replicas will have identical rowid information.

Example Method

Figure 7:
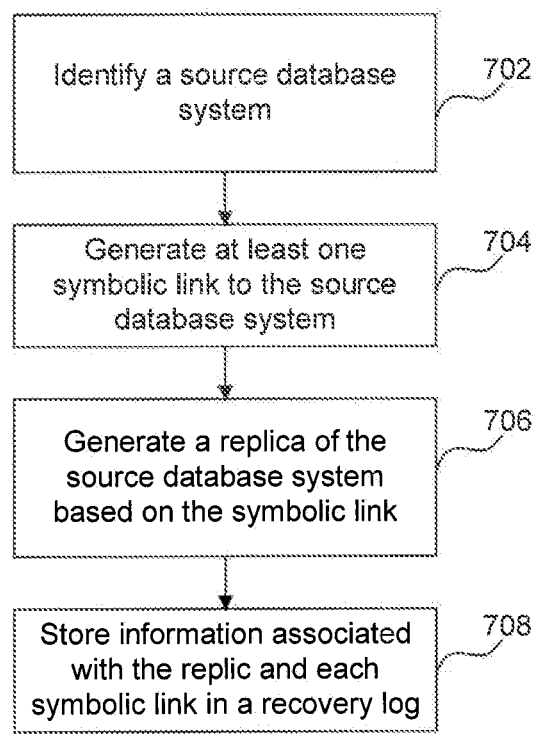
FIG. 7 is a flowchart illustrating a process by which a replication server facilitates replication via a partitioning scheme, according to an embodiment.

FIG. 7 is a flowchart illustrating an exemplary method 700, according to an embodiment. In one example, method 700 can be used to perform replication via a partitioning scheme. For ease of explanation, system 200 in FIG. 2 will be used to describe method 700, but method 700 is not intended to be limited thereto. The method 700 may not occur in the order shown, or require all of the steps shown in FIG. 7.

At step 702, a source database table is identified. The source database table includes a main index and a delta log. For example, step 702 may be performed by replication server 206 of system 200. A source database table is identified based on a query request. As discussed previously, in an embodiment, a relational database may implement a variant of the Structured Query Language (SQL). In operation, for example, a client computing device can issue one or more SQL commands to the server hosting the source database. SQL commands may specify, for instance, a query for retrieving particular data (i.e., data records meeting the query condition) from the source database table. In addition to retrieving the data from source database table(s), the client computing device has the ability to issue commands to insert new rows of data records into the table(s), or to update and/or delete existing records in the table(s).

At step 704, one or more symbolic links to the source database table is generated. The symbolic link identifies a path to the source database table. For example, step 704 may be performed by replication server 206 of system 206 A symbolic link can be a file that includes a reference to the source database table in the form of an absolute or relative path. Symbolic links operate transparently for most operations. Thus, programs that read or write to files named by a symbolic link will behave as if operating directly on the target file. A symbolic link includes a text string that is automatically interpreted and followed by the persistence layer of the database as a path to the source database table. This resembles a symbolic link like in the operating system Linux.

At step 706, a replica of the source database table is generated on the source database system and at least one target database system based on each symbolic link. The replica includes a copy of the main index and delta log of the source database. For example, step 706 may be performed by replication server 206 of system 200. The replica is a copy of the source database table and its associated files. The replica can include at least a copy of a main index file and a delta log. Since the replica is generated based on the symbolic links, which is essentially a pointer to the source database, it requires significantly less CPU consumption. This is due to the fact that all files of the replica are initially empty with the exception of the symbolic link information.

At step 708, information associated with the replica and each symbolic link is stored in a recovery log. For example, step 708 may be performed by replication server 206 of system 200. Changes prior to the copy process to the source database are tracked and logged in the delta log of the source database table and subsequently the delta logs of all replica via the symbolic links. Additionally, a recovery log maintains information related to symbolic links and also keeps track of changes to the source database table prior to a materialization operation. Since embodiments enable the recovery log to only keep track of the symbolic links and any delta log changes, the recovery log can be kept at a relatively small and manageable size and thus increase system performance.

Figure 8:
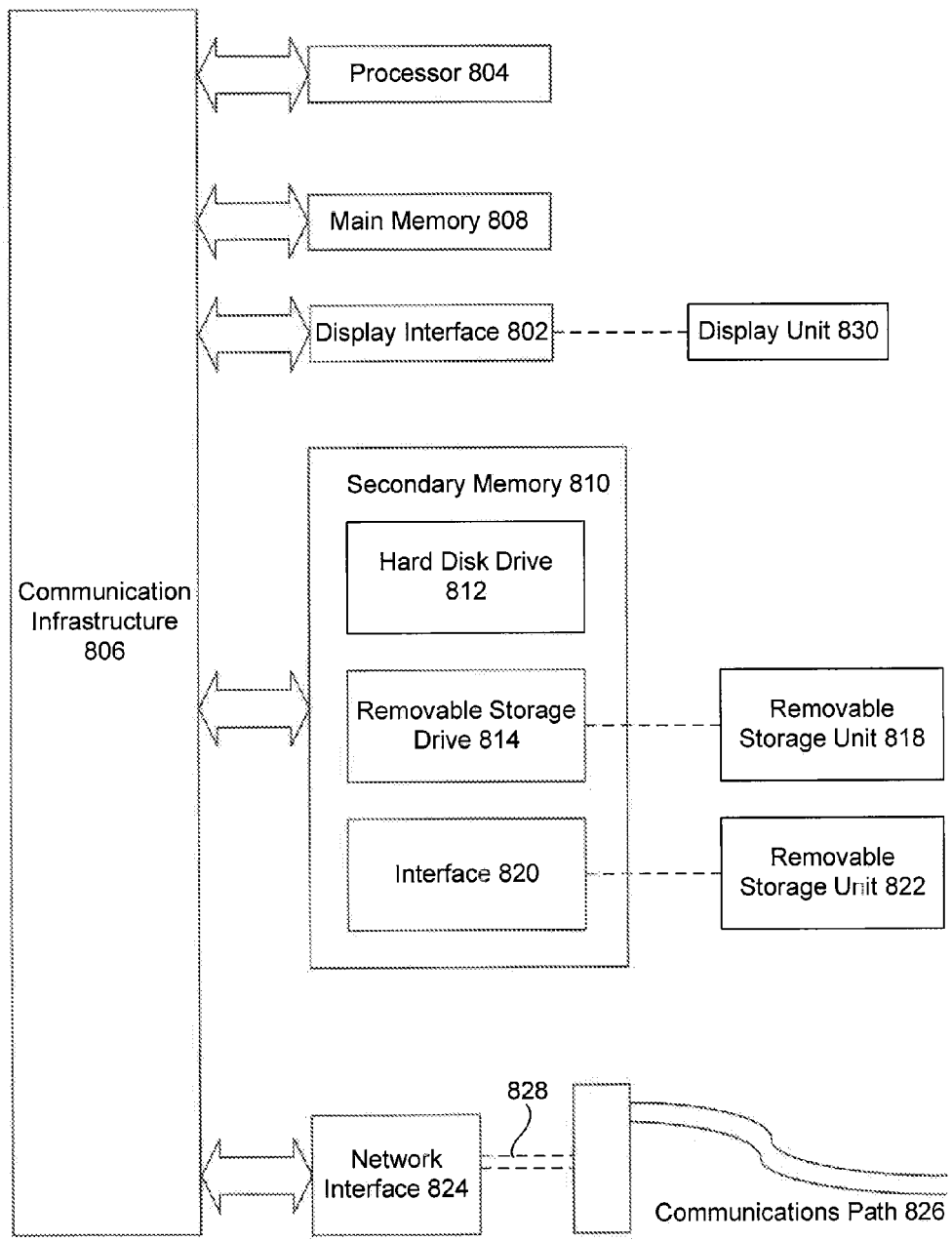
FIG. 8 illustrates an example computer useful for implementing components of various embodiments.

Various aspects of the present invention can be implemented by software, firmware, hardware, or a combination thereof. FIG. 8 illustrates an example computer system 800 in which the present invention, or portions thereof, can be implemented as computer-readable code. For example, the method illustrated by flowchart 700 of FIG. 7, can be implemented using system 800

Computer system 800 includes one or more processors, such as processor 804. Processor 804 can be a special purpose or a general purpose processor. Processor 804 is connected to a communication infrastructure 806 (for example, a bus or network).

Computer system 800 also includes a main memory 808, preferably random access memory (RAM), and may also include a secondary memory 810. Secondary memory 810 may include, for example, a hard disk drive 812, a removable storage drive 814, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals which may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor 804 to implement the processes of the present invention, such as the method illustrated by the flowchart of FIG. 8. Accordingly, such computer programs represent controllers of the computer system 800. Where the invention is implemented using software, the software may be stored in a computer program product and loaded into computer system 800 using removable storage drive 814, interface 820, hard drive 812 or communications interface 824.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for data replication within a database environment comprising:

identifying a source database table on a source computing device, wherein the source database table includes a main index file and a delta log file, such that the main index file maintains data stored in the source database table and the delta log file maintains changes to the main index file during transactions;

generating, on the source computing device and a target computing device, a plurality of symbolic links to the source database table, wherein each symbolic link identifies a path to a physical location of the source database table on the source computing device;

generating, on the source computing device and the target computing device, replicas of the source database table, wherein each replica is symbolically linked to the source database table utilizing the generated symbolic links, such that each replica includes a copy of the main index file and delta log file of the source database table; and storing the changes to the main index file associated with each replica and the symbolic links in a recovery log.

2. The method of claim 1, wherein generating one or more symbolic links comprises:

identifying a unique identifier for the source database table, wherein the unique identifier indicates the physical location of the source database table within the database environment;

converting the unique identifier into the path to the source database table; and generating a pointer to the source database table based on the path.

3. The method of claim 1, further comprising:

detecting the data change request, wherein the data change request indicates at least one of an add, update, and delete of data in the source database table;

storing information related to the data change request in the delta log file of the replica; and updating the recovery log with the information related to the data change request.

4. The method of claim 3, further comprising:

materializing the replica at the target computing device, wherein materializing includes propagating data from the source database table to the replica at the target computing device utilizing the replica at the source computing device;

generating a reference count based on the symbolic links;

removing the symbolic links following materializing of the replica; and deleting the source database table, when the reference count meets a predetermined threshold.

5. The method of claim 1, further comprising:
receiving a recovery request; and
re-generating the source database table and replica based on the recovery log.

6. The method of claim 1, further comprising:
propagating data from the source database table to the replica at the target computing device, wherein a copy of the main index file and the delta log file is created for the replica at the target computing device.

7. A system for data replication in a database system environment, the system comprising:
a source database;
a target database in communication with the source database; and
a replication server in communication with the source database and target database, the replication server configured to:
identifying a source database table on a source computing device, wherein the source database table includes a main index file and a delta log file, such that the main index file maintains data stored in the source database table and the delta log file maintains changes to the main index file during transactions;
generating, on the source computing device and a target computing device, a plurality of symbolic links to the source database table, wherein each symbolic link identifies a path to a physical location of the source database table on the source computing device;
generating, on the source computing device and the target computing device, replicas of the source database table, wherein each replica is symbolically linked to the source database table utilizing the generated symbolic links, such that each replica includes a copy of the main index file and delta log file of the source database table; and
storing the changes to the main index file associated with each replica and the symbolic links in a recovery log.

8. The system of claim 7, wherein the replication server is further configured to:
identify a unique identifier for the source database table, wherein the unique identifier indicates the physical location of the source database within the database environment, convert the unique identifier into the path to the source database table and generate a pointer to the source database table based on the path.

9. The system of claim 7 wherein the replication server is further configured to:
detect the data change request, wherein the data change request indicates at least one of an add, update, and delete of data in the source database, store information related to the data change request in the delta log file of the replica, and update the recovery log with the information related to the data change request.

10. The system of claim 7 wherein the replication server is further configured to:
materialize the replica including propagating data from the source database table to the replica, generate a reference count based on the symbolic links, remove the symbolic links, and remove the source database table, when the reference count meets a predetermined threshold.

11. The system of claim 7, wherein the replication server is further configured to:
receive a recovery request and re-generate the source database table and replica based on the recovery log.

12. The system of claim 7, wherein the replication server is further configured to:
propagate the data of the source database table to each replica, wherein a copy of the main index file and the delta log file is created for each replica.

13. A non-transitory computer-readable storage medium having control logic stored therein,
said control logic when executed causing a processor to perform operations for data replication in a database system environment, the operations comprising:
identifying a source database table on a source computing device, wherein the source database table includes a main index file and a delta log file, such that the main index file maintains data stored in the source database table and the delta log file maintains changes to the main index file during transactions;
generating, on the source computing device and a target computing device, a plurality of symbolic links to the source database table, wherein each symbolic link identifies a path to a physical location of the source database table on the source computing device;
generating, on the source computing device and the target computing device, replicas of the source database table, wherein each replica is symbolically linked to the source database table utilizing the generated symbolic links, such that each replica includes a copy of the main index file and delta log file of the source database table; and
storing the changes to the main index file associated with each replica and the symbolic links in a recovery log.

14. The non-transitory computer-readable storage medium of claim 13, the operations further comprising:
identifying a unique identifier for the source database table, wherein the unique identifier indicates the physical location of the source database table within the database environment;
converting the unique identifier into the path to the source database table; and
generating a pointer to the source database table based on the path.

15. The non-transitory computer-readable storage medium of claim 13, the operations further comprising:
detecting the data change request, wherein the data change request indicates at least one of an add, update, and delete of data in the source database table;
storing information related to the data change request in the delta log file of the replica; and
updating the recovery log with the information related to the data change request.

16. The non-transitory computer-readable storage medium of claim 15, the operations further comprising:
materializing the replica, wherein materializing includes propagating data from the source database table to the replica;
generating a reference count based on the one or more symbolic links;
removing the symbolic links following materializing the replica; and
deleting the source database table, when the reference count meets a predetermined threshold.

17. The non-transitory computer-readable storage medium of claim 13, the operations further comprising:
receiving a recovery request; and
re-generating the source database table and replica based on the recovery log.

18. The non-transitory computer-readable storage medium of claim 13, the operations further comprising:

propagating data from the source database table to the replica, wherein a copy of the main index file and the delta log file is created for the replica.

19. The method of claim 1, wherein the symbolic links comprise of a pointer and a soft link, such that the symbolic link is automatically interpreted to read on an absolute or relative file path to the source database table.

20. The method of claim 1, wherein the recovery log resides on a separate computing device from the source computing device.

21. The system of claim 7, wherein the symbolic links comprise of a pointer and a soft link, such that the symbolic link is automatically interpreted to read on an absolute or relative file path to the source database table.

22. The system of claim 7, wherein the recovery log resides on a separate computing device from the source computing device.

23. The non-transitory computer-readable storage medium of claim 13, wherein the symbolic links comprise of a pointer and a soft link, such that the symbolic link is automatically interpreted to read on an absolute or relative file path to the source database table.

24. The non-transitory computer-readable storage medium of claim 13, wherein the recovery log resides on a separate computing device from the source computing device.

* * * * *